Patented Jan. 11, 1949

2,459,125

UNITED STATES PATENT OFFICE 2,459,125

FILM OF COPOLYMER OF VINYLIDENE CHLORIDE AND VINYL CHLORIDE

La Verne E. Cheyney, Akron, Ohio, assignor to Wingfoot Corporation, Akron, Ohio, a corporation of Delaware No Drawing. Application October 24, 1944, Serial No. 560,205

4 Claims. (Cl. 260—45.5)

This invention relates to a new film composition having valuable properties adapting it to use as a wrapping material, especially where a moisture-resistant film is required. More particularly, it relates to a film comprised of a blend of solid polymers, one of which consists of a copolymer of vinyl chloride and vinylidene chloride in a definite range of composition and the other of which is either a polymer of vinyl chloride or a copolymer of vinyl chloride and a minor proportion of another monomer.

Throughout this specification and the appended claims the expression "a polymer of monomeric substances containing vinyl chloride as their principal component" is used to define a class of solid resinous compositions including polyvinyl chloride and copolymers of vinyl chloride and minor proportions of other olefinic compositions. These compositions are also referred to as "high vinyl chloride polymers".

Solid polymers of monomeric substances containing more than 70 percent vinyl chloride can be fabricated readily into strong films, which however, are not sufficiently resistant to the transmission of water vapor to render them useful as wrapping films where protection against moisture or evaporation is desired. On the other hand, many copolymers which are relatively impervious to water vapor, such as soluble copolymers of vinyl chloride and 40 to 80 percent of vinylidene chloride, are not strong enough to be used in the fabrication of wrapping films. Accordingly, it is the purpose of this invention to provide new wrapping films of improved strength, flexibility, and resistance to the transmission of water vapor.

I have discovered that copolymers of 40 to 80 percent of vinylidene chloride and vinyl chloride may be blended with polyvinyl chloride or copolymers of vinyl chloride preferably of upwards of 70 percent of vinyl chloride to form compositions suitable for the fabrication of films. It is significant that my compositions, prepared by the blending of polymers, are transparent and strong, while compositions made by the simultaneous polymerization of the same monomeric constituents often are either incompatible mixtures or apparently compatible mixtures which are not capable of being fabricated into strong films. My invention provides a method of fabricating film compositions having properties substantially superior to either of the two polymers blended or to a copolymer prepared by the copolymerization of the same proportions of the identical monomers.

The new blended composition may contain from 10 to 90 parts by weight of the vinylidene chloride copolymer and from 90 to 10 parts of the high vinyl chloride polymer. The preferred range of polymer mixtures is from 30 to 70 percent of either component. Thus, from 30 to 70 parts by weight of vinylidene chloride copolymer may be blended with from 70 to 30 parts of the high vinyl chloride polymer to form compositions having preferred physical properties. When 50 to 70 percent of vinylidene chloride copolymer is used, compositions having maximum resistance to the transmission of water vapor are produced. On the other hand, when 30 to 50 percent of vinylidene chloride copolymer is used, a film of maximum tensile and flexural properties is prepared with only slight reduction in the resistance to the transmission of water vapor.

The high vinyl chloride polymer operative in the practice of this invention is preferably a copolymer of more than 70 percent of vinyl chloride and up to 30 percent of vinylidene chloride, ethyl maleate or other alkyl maleates, vinyl acetate, ethyl acrylate or other alkyl acrylates, or the esters of alpha alkyl or chlorine substituted acrylates, ethyl or other alkyl fumarates, or the alkyl chloromaleates.

The polymer blends may be made by mechanically mixing copolymer of vinylidene chloride with the resinous high vinyl chloride polymer. For the manufacture of films the method of casting a solution of the blended polymers is preferred, which method involves the preparation of a solution of the constituents to be blended. Suitable solvents are ethylene dichloride, benzene, toluene and cyclohexanone. Generally, any liquid which is a solvent for both of the polymer constituents will be suitable. Relatively volatile solvents are preferred, but the exact nature of the solvent will depend upon the method to be used in casting the films. Any method known to the art of casting film may be used, for example, the deposition of the solution upon a moving belt with evaporation of the solvent and subsequent stripping of the dried cast film from the belt. The films may also be prepared by calendering operations. Further details of the preparation of films from blended polymers will be set forth with respect to specific detailed examples.

Example 1

Seven parts by weight of a solid copolymer of 95 percent of vinyl chloride and 5 percent of vinyl acetate and seven parts of a copolymer of 65 percent of vinylidene chloride and 35 percent of vinyl chloride were dissolved in 136 parts of ethylene dichloride. The solution was deposited on a moving belt in such quantity that with the evaporation of the ethylene dichloride a blended polymer film 0.0018 inch in thickness was prepared.

The homogeneous transparent film so prepared was tested by means of a standard method to determine the rate of water vapor transfer. (The test method is described in "Modern Packaging", November 1942, page 78). Under identical conditions a film of the copolymer of vinyl acetate and vinyl chloride used in the preparation of the blended polymer was tested as a control. The new film of blended polymer was found to have a rate of water vapor transfer of 7.3 g./m.$^2$/24 hours at 100° F., while the control film was measured as 26.2 g./m.$^2$/24 hours. The impact strength was measured by noting the height from which a steel ball one inch in diameter must be dropped to cause a rupture of the film. The control film was ruptured by a five inch drop, while the new blended film did not fail under a drop test of sixty inches. A film of the copolymer of 65 percent of vinylidene chloride and 35 percent of vinyl acetate was prepared and tested by the falling ball test and was found to have virtually no impact strength.

The practice of this invention may be varied considerably without departing from the inventive concept. Thus, the following compositions are illustrative of the variations possible in the practice of this invention:

(a) Three parts of a copolymer of 90 percent vinyl chloride and 10 percent vinyl acetate. Two parts of a copolymer of 65 percent vinylidene chloride and 35 percent vinyl chloride.

(b) Seven parts of a copolymer of 90 percent vinyl chloride and 10 percent vinyl acetate. Three parts of a copolymer of 65 percent vinylidene chloride and 35 percent vinyl chloride.

(c) Three parts of a copolymer of 90 percent vinyl chloride and 10 percent vinyl acetate. Two parts of a copolymer of 60 percent vinylidene chloride and 40 percent vinyl chloride.

(d) Three parts of a copolymer of 90 percent vinyl chloride and 10 percent vinyl acetate. Seven parts of a copolymer of 65 percent vinylidene chloride and 35 percent vinyl chloride.

(e) One part of a copolymer of 90 percent vinyl chloride and 10 percent vinyl acetate. One part of a copolymer of 50 percent vinylidene chloride and 50 percent vinyl chloride.

(f) One part of a copolymer of 95 percent vinyl chloride and 5 percent diethyl maleate. One part of a copolymer of 65 percent vinylidene chloride and 35 percent vinyl chloride.

(g) One part of a copolymer of 80 percent vinyl chloride and 20 percent diethyl maleate. One part of a copolymer of 60 percent of vinylidene chloride and 40 percent of vinyl chloride.

(h) One part of a copolymer of 90 percent vinyl chloride and 10 percent diethyl fumarate. Four parts of a copolymer of 40 percent vinylidene chloride and 60 percent vinyl chloride.

(i) Three parts of a copolymer of 70 percent vinyl chloride and 30 percent diethyl fumarate. Two parts of a copolymer of 70 percent vinylidene chloride and 30 percent vinyl chloride.

(j) Three parts of a copolymer of 90 percent vinyl chloride and 10 percent of diethyl chloromaleate. Two parts of a copolymer of 50 percent vinylidene chloride and 50 percent vinyl chloride.

(k) One part of a copolymer of 90 percent vinyl chloride, and 10 percent vinylidene chloride. One part of a copolymer of 60 percent vinylidene chloride and 40 percent vinyl chloride.

(l) One part of a copolymer of 90 percent vinyl chloride and 10 percent of methyl methacrylate. One part of a copolymer of 75 percent vinylidene chloride and 25 percent vinyl chloride.

(m) One part of a copolymer of 85 percent vinyl chloride and 15 percent of ethyl chloroacrylate. Two parts of a copolymer of 60 parts vinylidene chloride and 40 parts of vinyl chloride.

(n) Two parts of a copolymer of 75 percent vinyl chloride and 25 percent of methyl acrylate. One part of a copolymer of 75 percent vinylidene chloride and 25 percent vinyl chloride.

The foregoing examples illustrate compositions obtained by blending two polymers. The practice of this invention is not limited merely to the blending of two components. Under some circumstances it is desirable to incorporate three or more polymers. For example, a satisfactory material can be made by blending two parts of a copolymer of 60 percent of vinylidene chloride and 40 percent of vinyl chloride, one part of polyvinyl chloride and one part of a copolymer of 90 percent vinyl chloride and 10 percent vinyl acetate.

The blended polymers may be modified by the incorporation of other materials, such as plasticizers, curatives, pigments, and other modifying materials. It may, under some circumstances, be desirable to incorporate materials adapted to facilitate the removal of the films from the casting surfaces. For this purpose, 1–10 percent of a material, such as carnauba wax or lecithin, may be incorporated.

Although the invention has been described with respect to specific examples, it is not intended that the details thereof shall be construed as limitations on the scope of the invention except as incorporated in the following claims.

I claim:

1. A homogeneous resin film comprised essentially of an intimately blended mixture of from 30 to 70 parts by weight of a copolymer of 50 to 70 percent (by weight of the polymerizable components) of vinylidene chloride and 50 to 30 percent of vinyl chloride, and 70 to 30 parts of polyvinyl chloride.

2. A homogeneous resin film comprised essentially of an intimately blended mixture of 30 to 70 parts by weight of a copolymer of 50 to 70 percent (by weight of the polymerizable components) of vinylidene chloride and from 50 to 30 percent of vinyl chloride, and from 70 to 30 parts of at least one resin of the group consisting of polyvinyl chloride and a copolymer of over 70 percent of vinyl chloride and up to 30 percent of another mono-olefinic monomer.

3. A homogeneous resin film comprised essentially of intimately blended mixture of 30 to 70 parts by weight of a copolymer of 50 to 70 percent (by weight of the polymerizable components) of vinylidene chloride and from 50 to 30 percent of vinyl chloride, and from 70 to 30 parts of a copolymer of over 70 percent of vinyl chloride and up to 30 percent of diethyl fumarate.

4. A homogeneous resin film comprised essentially of an intimately blended mixture of 30 to 70 parts by weight of a copolymer of 50 to 70 percent (by weight of the polymerizable components) of vinylidene chloride and from 50 to 30 percent of vinyl chloride, and from 70 to 30 parts of a copolymer of over 70 percent of vinyl chloride and up to 30 percent of diethyl maleate.

LA VERNE E. CHEYNEY.

REFERENCES CITED

The following references are of record in the file of this patent:

UNITED STATES PATENTS

| Number | Name | Date |
|---|---|---|
| 2,160,934 | Wiley | June 6, 1939 |
| 2,371,618 | Hanson et al. | Mar. 20, 1945 |